United States Patent
Yen et al.

(10) Patent No.: US 9,335,427 B2
(45) Date of Patent: May 10, 2016

(54) HIGH VOLTAGE SHIELDING TO ENABLE PASCHEN REGION OPERATION FOR NEUTRON DETECTION SYSTEMS

(71) Applicant: General Electric Company, Schenectady, NY (US)

(72) Inventors: Yichin Yen, Hinckley, OH (US); Randy Dixon Austin, Hudson, OH (US); Benjamin John Olechnowicz, Stow, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/087,202

(22) Filed: Nov. 22, 2013

(65) Prior Publication Data

US 2015/0144799 A1   May 28, 2015

(51) Int. Cl.
*G01T 3/00* (2006.01)
*G01T 3/02* (2006.01)
*H01J 47/12* (2006.01)

(52) U.S. Cl.
CPC . *G01T 3/008* (2013.01); *G01T 3/00* (2013.01); *G01T 3/02* (2013.01); *H01J 47/12* (2013.01)

(58) Field of Classification Search
CPC ............. G01T 3/008; G01T 3/02; H01J 47/12
See application file for complete search history.

(56) References Cited

U.S. PATENT DOCUMENTS

| | | | | |
|---|---|---|---|---|
| 2,392,748 | A | * | 1/1946 | Lee .............................. 174/22 R |
| 3,229,092 | A | * | 1/1966 | Eberline ....................... 250/392 |
| 3,860,824 | A | * | 1/1975 | Stone ....................... 250/390.01 |
| 4,163,152 | A | | 7/1979 | Suzuki |
| 4,288,291 | A | * | 9/1981 | Cisco et al. .................... 376/153 |
| 4,463,264 | A | | 7/1984 | Young et al. |
| 5,165,956 | A | | 11/1992 | Wong |
| 5,350,779 | A | | 9/1994 | Hermansen et al. |
| 5,699,231 | A | | 12/1997 | ElHatem et al. |
| 7,622,724 | B2 | | 11/2009 | Chang et al. |
| 8,107,207 | B2 | | 1/2012 | Hotchkiss et al. |
| 8,426,253 | B2 | | 4/2013 | Chou et al. |
| 2006/0098778 | A1 | | 5/2006 | Oettinger et al. |

(Continued)

FOREIGN PATENT DOCUMENTS

| | | |
|---|---|---|
| EP | 0130124 A1 | 1/1985 |
| EP | 0348193 A2 | 12/1998 |

(Continued)

OTHER PUBLICATIONS

European Cooperation for Space Standardization, "Space engineering-High voltage engineering and design handbook." ECSS-E-HB-20-05A, Noordwijk, The Netherlands, Dec. 12, 2012.

(Continued)

*Primary Examiner* — David Porta
*Assistant Examiner* — Mindy Vu
(74) *Attorney, Agent, or Firm* — Cooper Legal Group, LLC

(57) ABSTRACT

An electrical system for an atomic particle detection assembly includes an electrical component electrically connected to an atomic particle detection unit. The electrical system includes a dielectric insulating material surrounding the electrical component. The electrical system also includes a conductive shielding material surrounding the dielectric insulating material. The conductive shielding material and a conductive element are at substantially the same electric potential.

17 Claims, 3 Drawing Sheets

(56) References Cited

U.S. PATENT DOCUMENTS

2008/0248669 A1 10/2008 Wing et al.
2008/0285923 A1* 11/2008 Scharf .................. G02B 6/4292
  385/89

FOREIGN PATENT DOCUMENTS

EP  0993238 A1  4/2000
EP  1336642 A1  8/2003
WO  2010017535 A2  2/2010

OTHER PUBLICATIONS

International Search Report and Written Opinion issued in connection with corresponding PCT Application No. PCT/US2014/066500 on Feb. 17, 2015.
GE Energy, "PSD Electronics System Neutron Detection Technology, Standard 25mm diameter detectors 8 Pack Assembly", Mar. 22, 2012.

* cited by examiner

HIGH VOLTAGE SHIELDING TO ENABLE PASCHEN REGION OPERATION FOR NEUTRON DETECTION SYSTEMS

BACKGROUND OF THE INVENTION

1. Field of the Invention

The present invention relates generally to a detection assembly and, in particular, to shielding for an atomic particle detection assembly.

2. Discussion of the Prior Art

Neutron detectors are used in neutron bombardment and scattering experiments. In a neutron detector, neutrons, ions, atomic particles, etc. resulting from neutron reactions within a cathode shell will collide with gas(es) contained within the shell to form free electrons. These free electrons are drawn to an anode, whereupon a signal is generated. This signal is transmitted to electronics (e.g., high voltage electronics) for analysis. Voltage breakdown in the high voltage electronics is possible as pressure in a chamber in which the voltage electronics are stored is reduced below atmospheric pressure. Accordingly, there is a need, and it would be beneficial, to provide a detector with a reduced likelihood of voltage breakdown.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides an electrical system for an atomic particle detection assembly. The electrical system includes an electrical component electrically connected to an atomic particle detection unit. The electrical system includes a dielectric insulating material surrounding the electrical component. The electrical system also includes a conductive shielding material surrounding the dielectric insulating material. The conductive shielding material and a conductive element are at substantially the same electric potential.

In accordance with another aspect, the present invention provides an electrical system for an atomic particle detection assembly. The electrical system includes an electrical component electrically connected to an atomic particle detection unit. The electrical component is disposed within a chamber at an operating pressure that is less than about one atmosphere. The electrical system includes a dielectric insulating material surrounding the electrical component. The electrical system includes a conductive shielding material surrounding the dielectric insulator and electrical component. The conductive shielding material and a conductive element have an electric potential within about 300 volts.

In accordance with another aspect, the present invention provides an atomic particle detection assembly including at least one atomic particle detection unit configured to detect atomic particles. The atomic particle detection assembly includes an electrical component electrically connected to the at least one atomic particle detection unit. The atomic particle detection assembly includes a dielectric insulating material surrounding the electrical component. The atomic particle detection assembly includes a conductive shielding material surrounding the electrical component surrounded by dielectric insulating material. The conductive shielding material and a conductive element are at substantially the same electric potential.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
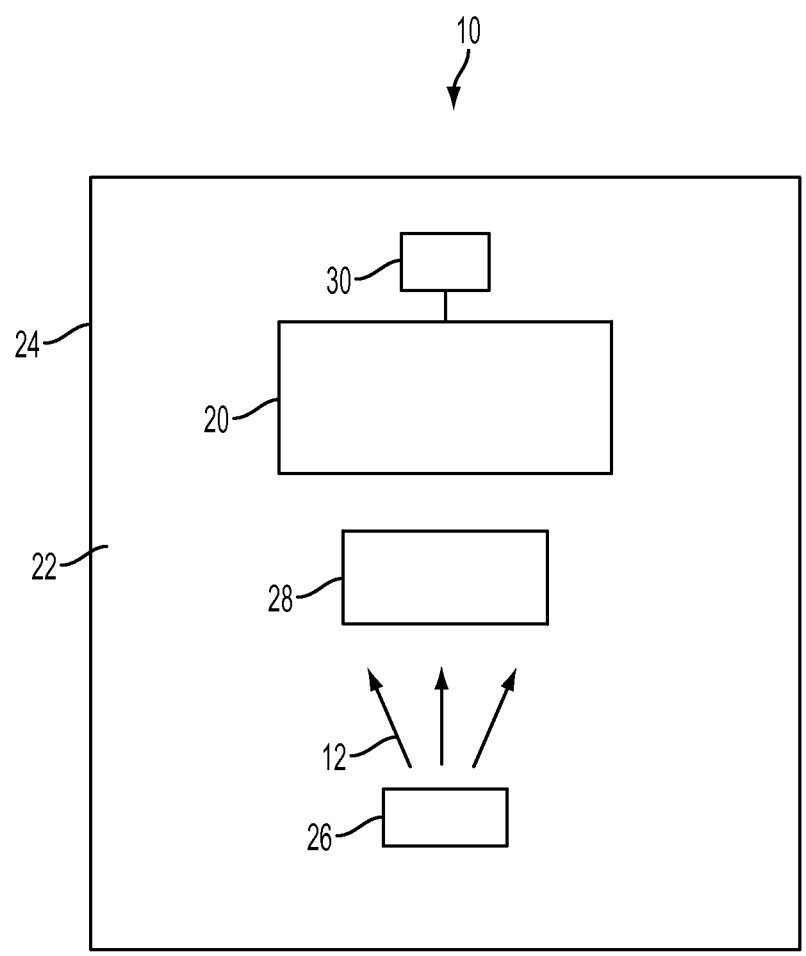
FIG. 1 is generic/schematic illustration of an example atomic particle detection assembly in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example embodiment of an atomic particle detection assembly 10. It is to be appreciated that the atomic particle detection assembly 10 is illustrated somewhat generically/schematically for ease of illustration. In general, the atomic particle detection assembly 10 can detect atomic particles 12, including neutrons, etc.

The atomic particle detection assembly 10 includes an atomic particle detection unit 20. The atomic particle detection unit 20 is somewhat generically/schematically depicted for illustration purposes, as the atomic particle detection unit 20 includes any number of constructions/configurations. In the illustrated example, the atomic particle detection assembly 10 includes one atomic particle detection unit 20, but in other examples, may include any number (e.g., one or more) of atomic particle detection units 20. The atomic particle detection unit 20 includes any number of structures, configurations, etc. For example, the atomic particle detection unit 20 may include at least one position sensitive detector that can detect the atomic particles 12. The position sensitive detector of the atomic particle detection unit 20 can record where interaction of the atomic particles 12 occurs, such that this location determination can facilitate the study of atomic particle interactions.

The atomic particle detection unit 20 is positioned within a chamber 22. The chamber 22 is located within a chamber enclosure 24, which may include a housing, wall(s), surface(s), ceiling(s), etc. that define the chamber 22. In some examples, the atomic particle detection unit 20 may be attached to and/or supported by/within the chamber enclosure 24. The chamber 22 includes any number of sizes, shapes, and configurations, and is not limited to the illustrated dimensions.

In an example, the chamber 22 is maintained at an operating pressure. For example, the chamber enclosure 24 may be evacuated of fluids, such as air and other gases, such that the chamber enclosure 24 defines a generally closed and/or sealed environment. In some examples, the chamber 22 includes a negative operating pressure, such as within the Paschen region. In an example, the operating pressure of the chamber 22 approaches an absolute vacuum at zero Pascal (Pa). By maintaining the chamber 22 at a negative operating pressure, atomic particle transport, including neutron transport, may be increased due to a reduced interaction between the atomic particles 12 and air molecules. Further, the likelihood of atomic particles 12 being scattered by air and, thus, escaping detection by the atomic particle detection unit 20, is also mitigated by having the negative operating pressure.

The atomic particle detection assembly 10 includes a source 26 positioned within the chamber 22. In the illustrated example, the source 26 may be positioned a distance away from the atomic particle detection unit 20. The source 26 can emit atomic particles 12 (e.g., neutrons, for example). In an example, a material 28 is positioned within the chamber 22 between the source 26 and the atomic particle detection unit 20. The source 26 can emit atomic particles 12 that travel from the source 26 and towards the atomic particle detection unit 20 and the material 28. At least some of the atomic particles 12 may interact with the material 28, causing scattering of the atomic particles 12. In an example, the atomic particle detection unit 20 will detect at least a portion of the atomic particles 12 that have interacted with the material 28 and at least a portion of the atomic particles 12 that have not interacted with the material 28.

The atomic particle detection assembly 10 includes an electrical system 30. In some examples, the electrical system 30 is electrically connected to the atomic particle detection unit 20. It will be appreciated that the electrical connection between the electrical system 30 and the atomic particle detection unit 20 is illustrated somewhat generically/schematically in FIG. 1. In operation, however, any number of different types of wires, conductors, etc. can be used to electrically connect the electrical system 30 to the atomic particle detection unit 20. In some examples, the electrical system 30 includes a high voltage electrical system that is capable of handling relatively high voltages associated with the atomic particle detection unit 20. The electrical system 30 performs any number of functions, including sending and/or receiving detection signals to/from the atomic particle detection unit 20.

Figure 2:
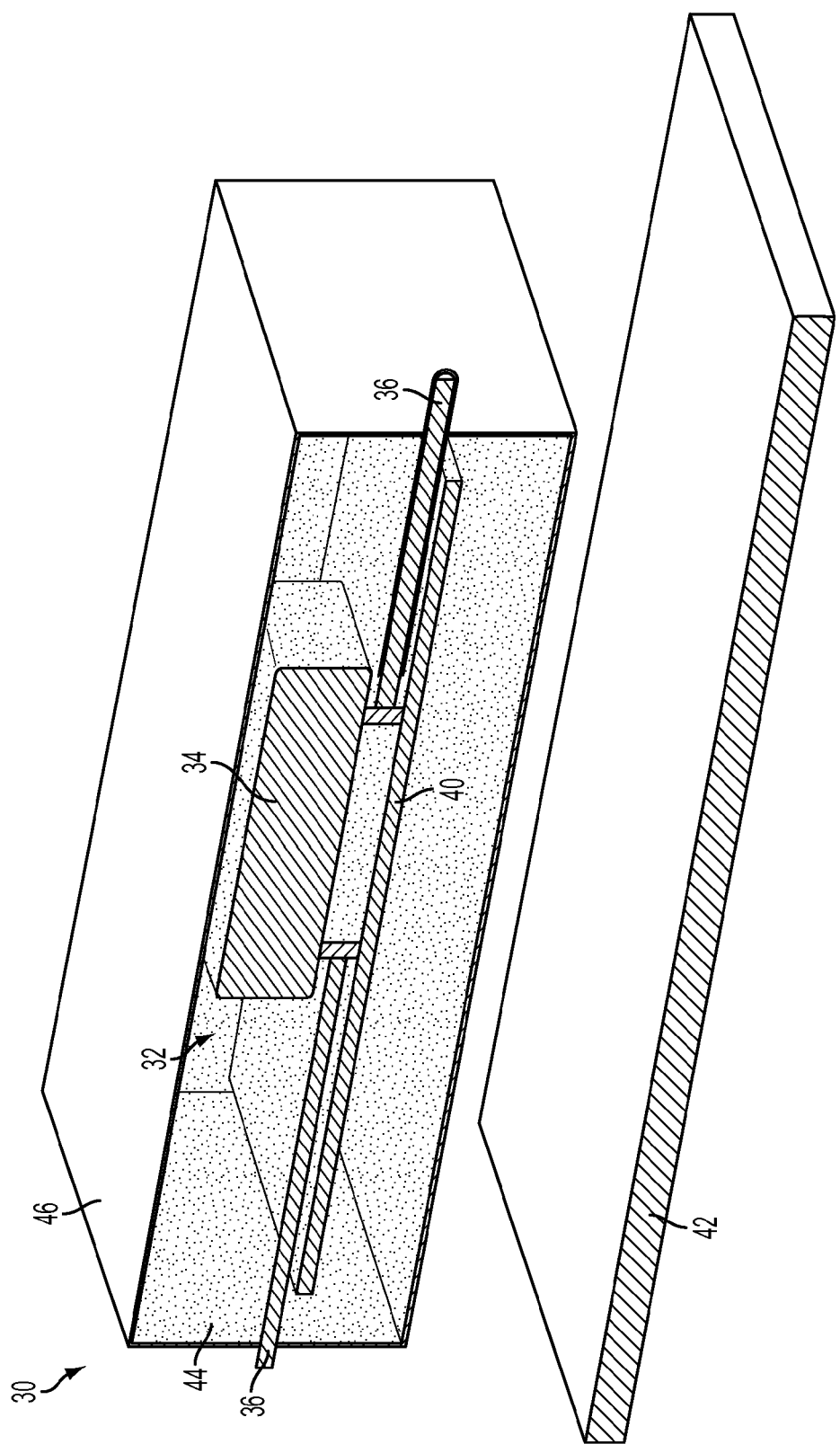
FIG. 2 is a torn open sectional view of an example electrical system for use in an atomic particle detection assembly in accordance with an aspect of the present invention.

Turning to FIG. 2, an example of the electrical system 30 is illustrated. It will be appreciated that the electrical system 30 is illustrated as being partially torn open/sectioned off for ease of illustration and to more clearly show internal portions of the electrical system 30. In operation, however, the electrical system 30 is closed off and/or fully formed, such that the internal portions of the electrical system 30 may normally not be visible.

The electrical system 30 can include one or more electrical components 32. In some examples, the electrical components 32 are disposed within the chamber 22, such that the electrical system 30 is maintained at the operating pressure that is less than about one atmosphere. The electrical components 32 include any number of structures. In the illustrated example, the electrical components 32 include a first electrical component 34 and a second electrical component 36. The first electrical component 34 may include any number of electrical structures, including capacitors, resistors, transistors, modules, wires, conduits, etc. The first electrical component 34 can be attached to/supported by a circuit board 40, in an example. It will be appreciated that the first electrical component 34 and circuit board 40 are illustrated somewhat generically/schematically for ease of illustration, as the first electrical component 34 includes any number of structures, sizes, configurations, etc.

The electrical components 32 can include the second electrical component 36. In some examples, the second electrical component 36 is electrically connected to the first electrical component 34 (as illustrated). In other examples, however, the first electrical component 34 and second electrical component 36 may not be connected. The second electrical component 36 includes any number of electrical structures, including capacitors, resistors, transistors, modules, wires, conduits, etc. In the illustrated example, the second electrical component 36 includes a wire. In at least one possible example, the first electrical component 34 and/or the second electrical component 36 are electrically connected to the atomic particle detection unit 20.

In some examples, the electrical components 32 are located in proximity to a conductive element 42. The conductive element 42 includes any number of structures, such as ground, surrounding components, etc. The conductive element 42 is illustrated somewhat generically/schematically in FIG. 2, as the conductive element 42 includes any number of sizes, structures, configurations, etc. Likewise, the conductive element 42 is not limited to the illustrated position, and in some examples, can be positioned closer to or farther from the electrical components 32.

The electrical system 30 includes a dielectric insulating material 44 that surrounds and is in contact with the electrical components 32, including the first electrical component 34 and the second electrical component 36. The dielectric insulating material 44 can include any number of electrically insulating materials that exhibit high electrical resistivity. Also, the dielectric insulating material 44 can include any number of materials that exhibit high dielectric strength. In some examples, the dielectric insulating material 44 includes a polymeric material, a potting material, or the like. The potting material can include epoxy resin-based materials, silicone materials, polyurethane (PUR) materials, etc., alone or in combination. In an example, the dielectric insulating material 44 may include a solid insulating material with a controlled surface resistivity along with a controlled and/or defined surface conductivity such that surface charging of the dielectric insulating material 44 is reduced and/or minimized. The potting material provides a number of benefits, including long term stability (e.g., minimum aging over operating parameters), resistance to radiation damages (neutron, gamma, etc.), dielectric strength over the life cycle of the atomic particle detection assembly 10, and a relatively low outgassing rate. Likewise, the potting material can be selected and/or treated so as to avoid the occurrence of cracks, voids, delamination, and/or the presence of particles. In operation, the dielectric insulating material 44 can limit moisture, liquid, condensation, gas(es), etc. from contacting the electrical components 32.

The electrical system 30 includes a conductive shielding material 46 that surrounds the electrical components 32, including the first electrical component 34 and the second electrical component 36. The conductive shielding material 46 includes any number of structures, including, but not limited to, a metalized layer surrounding and covering the dielectric insulating material 44, or other similar conductive materials. In some examples, the conductive shielding material 46 is applied to, and is in contact with and/or covers the dielectric insulating material 44. The conductive shielding material 46 can be applied to the dielectric insulating material 44 in any number of ways, such as by coating, spraying, sputtering, attaching metal tape (e.g., copper, etc.), or the like.

To reduce the likelihood of electrical breakdown (e.g., arcing or partial discharge, etc.) between the electrical components 32 and the conductive element 42, the dielectric insulating material 44 surrounds the electrical components 32. In some examples, the dielectric insulating material 44 has a dielectric strength that does not substantially vary due to changes in vacuum level as would be the case with air (i.e., Paschen's Law). However, during operation, the dielectric insulating material 44 may contain an electric field that is proportional to the potential of the electrical components 32 and the conductive element 42. In particular, while the dielectric insulating material 44 may contain the electric field, such as by bounding/containing at least some of the free electrons present from the high voltage electrical components 32, there may be a surface charge accumulation on an outer surface of the dielectric insulating material 44.

In past examples, such a surface charge on the outer surface of the dielectric insulating material 44 may have led to voltage breakdown from the outer surface of the dielectric insulating material 44 to the conductive element 42. In particular, in some past examples, the high voltage electrical components 32, when operating in a critical pressure range such as the Paschen region, may generate plasma due to the relatively high voltage. In such an example, the plasma may provide a conductive path to trigger a breakdown to an unprotected low voltage electrical assembly. However, as illustrated herein, to limit/prevent the aforementioned voltage breakdown from occurring, the conductive shielding material 46 is in contact with the outer surface of the dielectric insulating material 44. In this example, the conductive shielding material 46 and the conductive element 42 are at substantially the same electric potential, or, in other examples, within about 300 volts. As such, the conductive shielding material 46 may therefore act as a ground cage and may absorb the surface charge, free electrons, etc. on the outer surface of the dielectric insulating material 44.

It will be appreciated that being at substantially the same electric potential does not require precisely the same electric potential. Instead, there may be some variation in the charges carried between the conductive shielding material 46 and the conductive element 42, such that the electric potential may be within about 300 volts. Due to the conductive shielding material 46 and the conductive element 42 being at substantially the same potential, the likelihood of electrical breakdown (e.g., voltage breakdown, discharge, etc.) between the electrical components 32 (e.g., the first electrical component 34 and/or the second electrical component 36) and the conductive element 42 is reduced.

Figure 3:
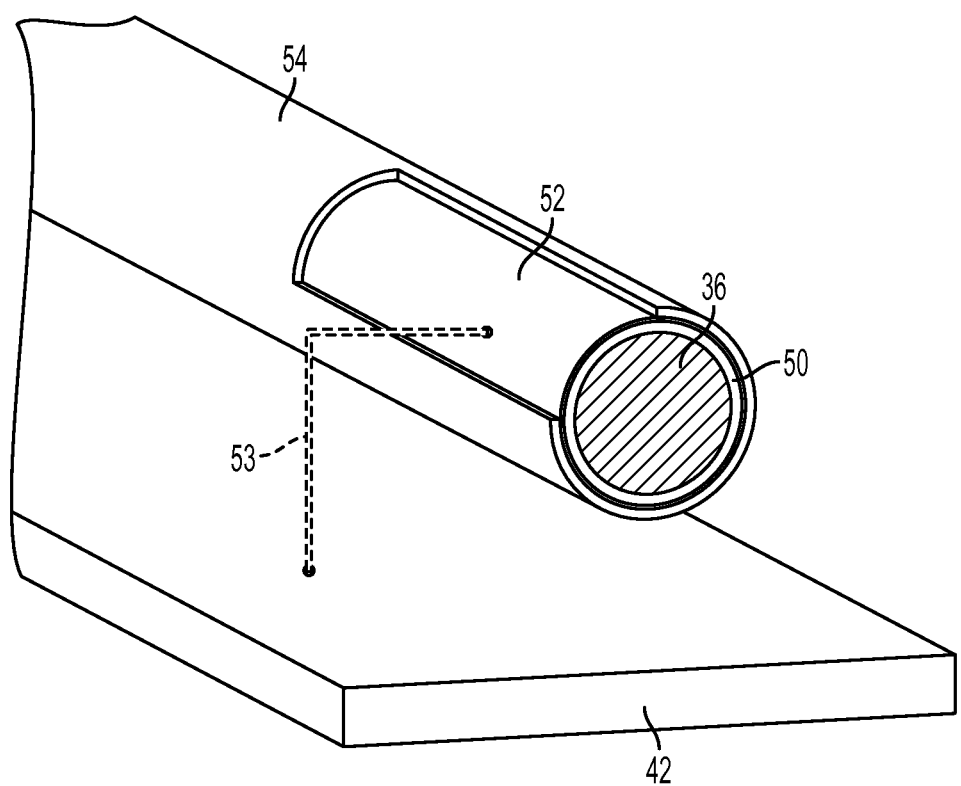
FIG. 3 is a perspective view of a portion of the example electrical system for use in an atomic particle detection assembly in accordance with an aspect of the present invention.

Turning to FIG. 3, a portion of the electrical system 30 is illustrated in which the second electrical component 36 includes a conductive wire. In some examples, the second electrical component 36 can be substantially identical to the second electrical component 36 illustrated in FIG. 2. In other examples, the second electrical component 36 can be different, such as by having a different size, shape, structure, etc. It will further be appreciated that only a portion of the second electrical component 36 is illustrated in FIG. 3 for ease of illustration. Indeed, in operation, the second electrical component 36 may be electrically connected to any number of structures, including, but not limited to, the first electrical component 34 (illustrated in FIG. 2), the atomic particle detection unit 20 (illustrated in FIG. 1), etc.

An insulating material, such as a first dielectric insulating material 50, can surround the second electrical component 36. The first dielectric insulating material 50 is in contact with the second electrical component 36. The first dielectric insulating material 50 includes any number of materials that exhibit dielectric properties, including the materials described above with respect to the dielectric insulating material 44. For example, the first dielectric insulating material 50 can include a polymeric material. The first dielectric insulating material 50 can limit moisture, liquid, condensation, gas(es), etc. from contacting the second electrical component 36.

A conductive shielding material 52 surrounds the second electrical component 36. In some examples, the conductive shielding material 52 surrounds and is in contact with the first dielectric insulating material 50. As such, the conductive shielding material 52 is disposed on an outer radial side of the first dielectric insulating material 50 while the second electrical component 36 is disposed on an inner radial side of the first dielectric insulating material 50. In the illustrated example, the conductive shielding material 52 extends circumferentially around the first dielectric insulating material 50. Though not illustrated, the conductive shielding material 52 can extend along substantially the entire length of the second electrical component 36. The conductive shielding material 52 includes any number of materials that are conductive, including a metal braid, the materials described above with respect to the conductive shielding material 52, other conductive materials, etc.

The conductive shielding material 52 is at substantially the same electric potential, or within about 300 volts, (illustrated generically/schematically with dashed lines 53) as the conductive element 42. It will be appreciated that the dashed lines 53 in the example of FIG. 3 are merely intended to illustrate that the conductive shielding material 52 and the conductive element 42 are at substantially the same electric potential (e.g., within about 300 volts). Indeed, the dashed lines 53 are not intended to illustrate that the conductive shielding material 52 is attached or connected to the conductive element 42, or the like.

In some examples, an insulating material, such as a second dielectric insulating material 54, can surround the conductive shielding material 52. The second dielectric insulating material 54 is in contact with the conductive shielding material 52. It will be appreciated that the second dielectric insulating material 54 is illustrated as being partially torn away for illustrative purposes and to more clearly show the conductive shielding material 52. However, in operation, the second dielectric insulating material 54 can fully surround the conductive shielding material 52. The second dielectric insulating material 54 includes any number of materials that exhibit dielectric properties, including the materials described above with respect to the dielectric insulating material 44 and the first dielectric insulating material 50. For example, the second dielectric insulating material 54 can include a polymeric material.

The conductive shielding material 52 is in contact with the first dielectric insulating material 50, which surrounds the second electrical component 36. During operation, the conductive shielding material 52 may carry a charge that is at substantially the same electric potential as the conductive element 42. In particular, to reduce the likelihood of electrical breakdown between the second electrical component 36 and the conductive element 42, the conductive shielding material 52 is at substantially the same electric potential as the conductive element 42, or, in other examples, within about 300 volts.

It will be appreciated that being at substantially the same electric potential does not require precisely the same electric potential. Instead, there may be some variation in the charges carried between the conductive shielding material 52 and the conductive element 42, such that the electric potential may be within about 300 volts. Due to the conductive shielding material 52 and the conductive element 42 being at substantially the same potential, the likelihood of electrical breakdown (e.g., voltage breakdown, discharge, etc.) between the second electrical component 36 and the conductive element 42 is reduced.

The atomic particle detection assembly 10 provides a number of benefits. For example, the chamber 22 is maintained at the operating pressure that is lower than 1 atmosphere. In some examples, this operating pressure may approach an absolute vacuum at zero Pa. As such, at this negative operating pressure, detection of the atomic particles 12 by the atomic particle detection unit 20 is improved, as there is less likelihood of atomic particle scattering by air. Additionally, the electrical system 30 can operate effectively despite being stored in the chamber 22 at the negative operating pressure. For instance, due to the dielectric insulating material 44, 50, 54 surrounding the electrical components 32, the dielectric insulating material 44, 50, 54 (e.g., potting material, polymeric material, etc.) can reduce outgassing, improve dielectric strength, resist radiation damage, limit the passage of condensation, moisture, gas(es) to the electrical components 32, etc.

Additionally, the conductive shielding material 46, 52 reduces the likelihood of electrical breakdown (e.g., voltage breakdown, discharge, etc.) between the electrical components 32 (e.g., the first electrical component 34 and/or the second electrical component 36) and the conductive element 42. In particular, the conductive shielding material 46, 52 is at substantially the same electric potential (e.g., within about 300 volts) as the dielectric insulating material 44, 50. Accordingly, if the dielectric insulating material 44, 50 carries a charge (e.g., due to surrounding the first electrical component 34 and/or the second electrical component 36), then the likelihood of electrical breakdown between the electrical components 32, 36 and the conductive element 42 is reduced since the conductive element 42 and the conductive shielding material 46, 52 are at substantially the same electric potential.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An electrical system for an atomic particle detection assembly, the electrical system including:
    an electrical component electrically connected to an atomic particle detection unit;
    a dielectric insulating material surrounding the electrical component, the dielectric material having an outer surface; and
    a conductive shielding material surroundingly engaging the outer surface of the dielectric insulating material, wherein the conductive shielding material and a different, conductive element are at substantially the same electric potential to inhibit voltage breakdown from the outer surface of the dielectric insulating material to the conductive element.

2. The electrical system of claim 1, wherein the dielectric insulating material is in contact with the electrical component.

3. The electrical system of claim 2, wherein the dielectric insulating material includes a potting material.

4. The electrical system of claim 1, wherein the conductive shielding material includes a metalized layer covering the dielectric insulating material.

5. The electrical system of claim 1, wherein the electrical component includes a conductive wire.

6. The electrical system of claim 1, wherein the electrical component is disposed within a chamber at an operating pressure that is less than about one atmosphere.

7. An electrical system for an atomic particle detection assembly, the electrical system including:
    an electrical component electrically connected to an atomic particle detection unit, the electrical component disposed within a chamber at an operating pressure that is less than about one atmosphere;
    a dielectric insulating material surrounding the electrical component, the dielectric material having an outer surface; and
    a conductive shielding material surroundingly engaging the outer surface of the dielectric insulator and the electrical component, wherein the conductive shielding material and a different, conductive element have an electric potential within about 300 volts to inhibit voltage breakdown from the outer surface of the dielectric insulating material to the conductive element.

8. The electrical system of claim 7, wherein the dielectric insulating material is in contact with the electrical component.

9. The electrical system of claim 8, wherein the dielectric insulating material includes a potting material.

10. The electrical system of claim 7, wherein the conductive shielding material includes a metalized layer covering the dielectric insulating material.

11. The electrical system of claim 7, wherein the electrical component includes a conductive wire.

12. An atomic particle detection assembly including:
    at least one atomic particle detection unit configured to detect atomic particles;
    an electrical component electrically connected to the at least one atomic particle detection unit;
    a dielectric insulating material surrounding the electrical component, the dielectric material having an outer surface; and
    a conductive shielding material surrounding the electrical component that is surrounded by the dielectric insulating material and surroundingly engaging the outer surface of the dielectric insulating material, wherein the conductive shielding material and a different, conductive element are at substantially the same electric potential to inhibit voltage breakdown from the outer surface of the dielectric insulating material to the conductive element.

13. The atomic particle detection assembly of claim 12, wherein the dielectric insulating material is in contact with the electrical component.

14. The atomic particle detection assembly of claim 13, wherein the dielectric insulating material includes a potting material.

15. The atomic particle detection assembly of claim 12, wherein the conductive shielding material includes a metalized layer covering the dielectric insulating material.

16. The atomic particle detection assembly of claim 12, wherein the electrical component includes a conductive wire.

17. The atomic particle detection assembly of claim 12, wherein the electrical component is disposed within a chamber at an operating pressure that is less than about one atmosphere.

\* \* \* \* \*